(12) United States Patent
Mahy et al.

(10) Patent No.: US 8,002,489 B2
(45) Date of Patent: Aug. 23, 2011

(54) SHOCK ABSORBER IN ELASTOMER MATERIAL FOR A SUSPENSION CONNECTING ROD OR OTHER CONNECTING COMPONENT

(75) Inventors: Frederic Mahy, Maincy (FR); Gerard Etoile, Nemours (FR); Pierre Cortesi, Saint Germain les Corbeil (FR); Pierre Delmon, Brive la Gaillarde (FR); Jean Mas, Terrasson Lavilledieu (FR)

(73) Assignees: Snecma, Paris (FR); Delmon Industrie, Paris (FR)

( * ) Notice: Subject to any disclaimer, the term of this patent is extended or adjusted under 35 U.S.C. 154(b) by 790 days.

(21) Appl. No.: 11/065,369

(22) Filed: Feb. 25, 2005

(65) Prior Publication Data

US 2005/0196227 A1 Sep. 8, 2005

(30) Foreign Application Priority Data

Feb. 25, 2004 (FR) ...................................... 04 01867

(51) Int. Cl.
*F16F 7/00* (2006.01)
(52) U.S. Cl. ..................................... 403/158; 267/141.2
(58) Field of Classification Search .......... 403/157–158, 403/122, 223–225, 291, 149; 40/330; 267/140, 267/141, 141.2, 141.6, 140.13, 152, 153, 279–281; 244/64, 54, 131, 17.27

See application file for complete search history.

(56) References Cited

U.S. PATENT DOCUMENTS

| | | | |
|---|---|---|---|
| 2,064,692 A * | 12/1936 | Shank | 403/158 |
| 3,831,888 A | 8/1974 | Baker et al. | |
| 4,139,245 A | 2/1979 | McCloskey | |
| 4,475,610 A | 10/1984 | Schwarzschild | |
| 5,058,829 A * | 10/1991 | Bentley | |
| 5,979,592 A | 11/1999 | Delgado | |
| 6,669,393 B2 * | 12/2003 | Schilling | |

FOREIGN PATENT DOCUMENTS

EP 1 302 680 A2 4/2003

* cited by examiner

*Primary Examiner* — Joshua T Kennedy
(74) *Attorney, Agent, or Firm* — Oblon, Spivak, McClelland, Maier & Neustadt, L.L.P.

(57) ABSTRACT

An absorber for a connecting component including a head with two faces parallel to each other is traversed by a bore forming a housing for a ball-joint including a cage. The absorber includes two elements in the form of discs, parallel to each other, each with a central opening sufficiently wide so as not to cover the portions of the ball-joint protruding in relation to the head and a connector configured to connect the two elements at their periphery.

19 Claims, 2 Drawing Sheets

SHOCK ABSORBER IN ELASTOMER MATERIAL FOR A SUSPENSION CONNECTING ROD OR OTHER CONNECTING COMPONENT

BACKGROUND OF THE INVENTION

1. Field of the Invention

The present invention pertains to a shock absorbing element for a connecting component, such as a connecting rod, with a flat head, mounted via a ball joint to a pin which is integral with a female yoke. The function of the element is to absorb vibrations between the head and the yoke. The particular use of this invention is for a suspension connecting rod for a module such as the housing enclosing the gears for driving accessory machines on a gas turbine engine applied to the aviation field.

2. Description of the Related Art

A gas turbine engine used for the propulsion of aircraft, a turbojet in particular, includes accessory machines necessary for its operation. Examples are fluid pumps for actuating the control, lubrication or fuel components and also electrical generators. These machines are installed mechanically driven by a gearbox which is itself connected to an engine shaft by a suitable mechanical link. The gearbox is designated by common accord by its abbreviation, AGB for "Accessory Gear Box", in the field concerned. The gearbox is maintained in suspension on the engine housing slightly downstream of the impeller stage by connecting rod-shaped connecting components.

A connecting rod consists of a rod ending at its two ends by a head of flat shape, with two parallel faces, in the bore of which an externally cylindrical cage is maintained by crimping. The internal surface of the cage acts as a guide to a sleeve with a spherical exterior surface forming a ball-joint. A self-lubricating cloth is glued to the inside of the cage which remains in contact with the spherical surface of the ball-joint to enable relative movements therebetween. This cloth enables the vibration phenomena to be absorbed by an assembly without play and with swivelling torque.

Each connecting rod head 10 is mounted between the lugs 21 and 23 of a female yoke 20 as shown in FIG. 1. In that figure one cannot see the entire connecting rod, only a portion of the head. The head includes two faces parallel to each other 11 and 12, pierced by a bore for the cage housing 13 with its ball-joint 14. The self-lubricating cloth is not shown. The head is maintained between the two lugs of the yoke by a screw 30 which passes through the lugs and the ball-joint. The screw is itself immobilised by a nut 33.

The connecting rod is immobilised axially depending on the direction of the screw 30 by the ball-joint which, as one can see in the figure, is pressing on one side against the internal face of the yoke lug 23 and on the other side against a shoulder 35 of the screw. As a result of this assembly with the ball-joint, the connecting rod head can pivot freely around the screw axis and around any axis perpendicular to the screw axis within the limits of the stops defined by the environment. The movement is limited in particular by the clearance existing on either side between the connecting rod head and the yoke lugs.

During the life-time of the engine, this link is subject to micro-movements due to vibration forces, in particular to stresses orientated parallel to the screw axis, due in particular to the low inclination of the connecting rods compared to the horizontal plane. These stresses in the long term end by wearing and degrading the self-lubricating cloth between the ball-joint and the cage. There follows contact and damage to the metal surfaces which necessitate a repair operation.

SUMMARY OF THE INVENTION

The intention of the present invention is to perfect a means of absorbing vibration between the connecting rod head and the lugs of the yoke in which it is mounted.

More generally the purpose of the invention is a means of absorbing vibration between a connecting component installed with a ball-joint between the two lugs of a yoke.

Sliding washers in elastomer material were proposed between the face-to-face surfaces of the connecting component head and the yoke. However, such an assembly is not easy since it is difficult to maintain the washers in place before assembling the screw while ensuring that they are centred. The technician has little space around the engine when the repair must be carried out under the aircraft wing, that is to say, outside the workshop. To resolve this problem, it was proposed to glue the washers on the faces of the connecting component head. However, this solution did not appear satisfactory since the adhesive inserts itself between the ball-joint and the cage causing degradation to the swivelling function.

The purpose of the invention is therefore a means of absorption for the connecting component which is simple to apply and which causes a significant increase in the life-time of the swivelling assembly.

In conformity with the invention, a shock absorber in elastomer material is produced for a connecting component, such as a connecting rod, the said component having a head with two faces parallel to each other and a bore forming a housing for a ball-joint with its cage, characterised in that it has two elements in the form of discs, parallel to each other, each with a central opening sufficiently wide so as not to cover the portions of the ball-joint which protrude in relation to the head and connected at their periphery by means of connection.

In conformity with another characteristic, the discs have a thickness at least equal to the portion of the ball-joint which protrudes in relation to one face of the head. This arrangement enables a disc to be compressed when tightening the screw in the yoke. During operation, the other disc at least comes also into contact with its adjacent surface and is compressed when the connecting component starts to tilt. This principle provides efficient absorption of vibration and prevents any contact between the head of the connecting component and the yoke lugs.

In conformity with one embodiment, the thicknesses of the two discs are identical.

In conformity with another embodiment, the two thicknesses are different.

Preferably, the said means of connection are formed by a plurality of arms. In particular for the connecting rod heads, they allow for the same absorber to be adapted to several types of geometry and diameters of heads. Where necessary the number and the dimension of the arms would be adapted to the geometry and to the diameter of the connecting component used. This provision enables the absorber to be installed easily, since the two discs can be moved away from each other easily and without effort.

The intention of the invention is also to provide a method to install an absorber on a connecting component, such as a connecting rod, supported by a pin between the lugs of a female yoke. According to this method, since the head of the connecting component is free, the absorber can be slid around the head in such a manner that the two elements in the form of a disc come each against one face of the said head, the head is inserted with the absorber between the lugs of the yoke and the connecting component is locked in the yoke by the said pin.

In accordance with one particular embodiment, since the clearance between each face and the adjacent lug is different and the absorber having one element thicker than the other, the thicker element is placed between the face and the lug which has the largest clearance.

The intention of the invention is also to provide an absorbing system for a connecting component installed on a yoke with two lugs having an absorber such as presented above between each face and the lug which faces it.

Now the absorber of the invention will be described in more detail with reference to the drawing in which

DETAILED DESCRIPTION OF THE PREFERRED EMBODIMENTS

Figure 2:
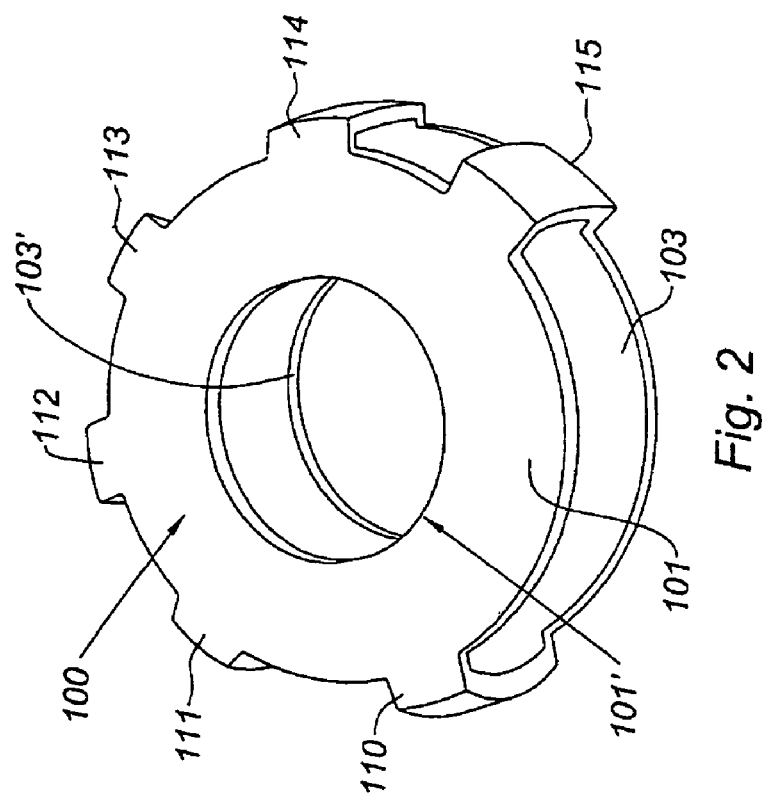
FIG. 2 shows in perspective an absorber in conformity with the invention.

Referring to FIG. 2, one sees the absorber of the invention before installing on the connecting component head. The absorber 100 consists of a first part 101 and a second element 103 in the form of discs. These two elements 101 and 103 have a central circular opening, 101' and 103' respectively. They are connected one to the other at their periphery by axial connection means, here by six arms 110, 111, 112, 113, 114 and 115 which maintain them at a determined distance. The arms are arranged so as to enable the absorber to be installed on the head of the connecting component. Preferably, the elements and the connecting means have come from the mould in the same material. The latter is an elastomer the chemical composition of which is suitable for the filtering function of vibration but also for the environment in which it is placed. For example, it can be necessary to provide resistance to chemical aggression, to oil and kerosene and to the various temperature conditions to which the absorber is subject during operation and when not in operation. For the application to the suspension of the AGB gearboxes of a turbojet, a fluorosilicone based elastomer would be suitable.

Figure 3:
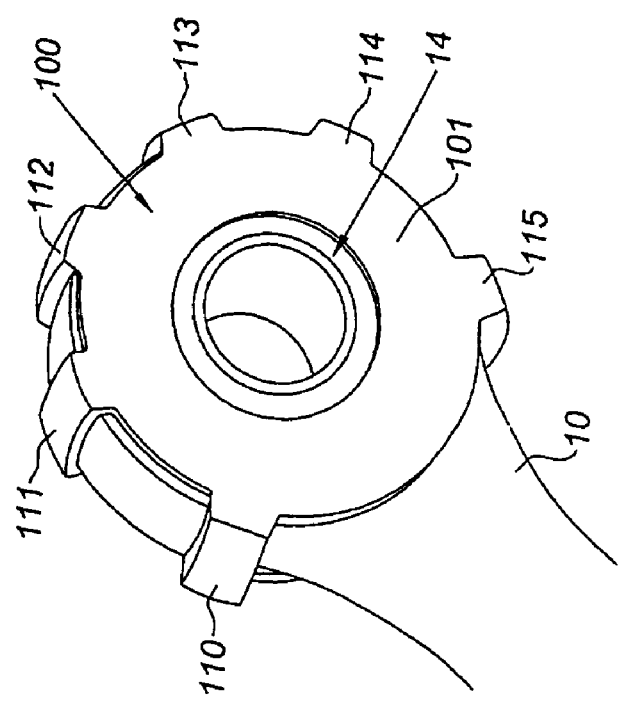
FIG. 3 shows the absorber mounted on a connecting rod head.

The absorber is shown in FIG. 3 in place on the head of the connecting component before the latter is installed on the yoke. The absorber has been slid onto the head like a sock, in accordance with the direction of installation indicated. The elements 101 and 103 are each applied on a face 11 or 12 of the head 10. The arms 110 to 115 maintain in place the two elements on the head. It was observed that the orifices 101' and 103' are sufficiently wide so as not to cover the portions of the ball-joint protruding on either side of the head 10. Further, the thicknesses of the elements 101 and 103 are sufficient so that the ball-joint 14 does not protrude compared to the planes of elements 101 and 103.

Figure 1:
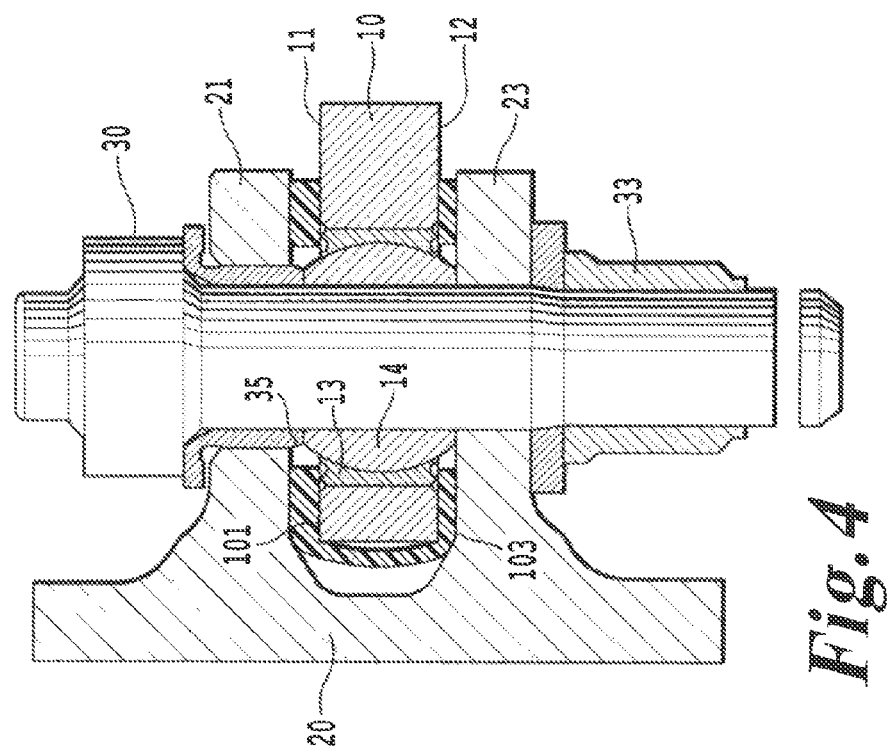
FIG. 1 shows the installation of a connecting component on a yoke in conformity with the prior art.
Figure 4:
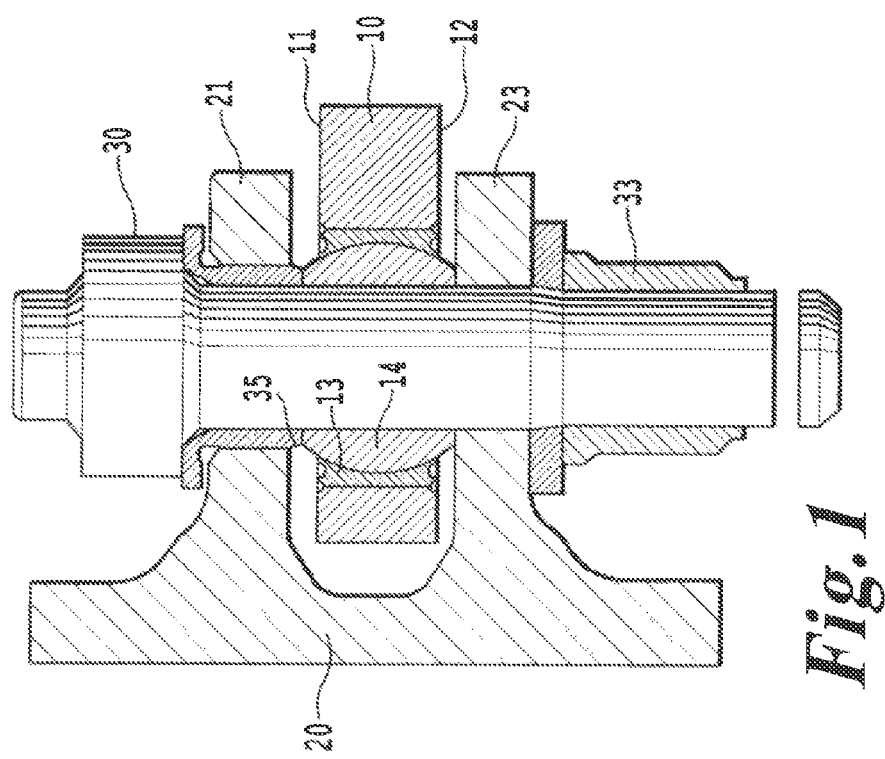
FIG. 4 shows in axial section the installation of the absorber of the invention.

In FIG. 4, the connecting rod head is shown mounted on the yoke as in FIG. 1 but this time it is provided with the absorber. Compared to FIG. 3 the two elements are slightly compressed between face 11 and lug 21 on the one hand and face 12 of head 10 and lug 23 on the other hand. The thickness of each of the elements has been chosen depending on these two plays.

For example for a connecting rod mounted on a yoke with a play of 1.7 mm on one side, and higher than the thickness of the disc on the other side, one has chosen two elements of the same thickness of 2 mm.

Endurance tests were carried out on the AGB gearbox rear suspension connecting rods. No change was found in the mechanical and dynamic behaviour of the suspension and therefore in its vibration endurance capacity. The insertion of the absorbers does not modify the technical definition of the pieces which provide the structural strength of the suspension. Consequently the engine vibration indications remain unchanged.

On the other hand, the vibration situation of the suspension connecting rods develops positively and significantly which is translated into a consequent increase in the life-time of the swivelling assembly.

Partial comparative vibration endurance tests between a connecting rod A without absorber and a connecting rod B with absorber were conducted to demonstrate the efficiency of the absorption.

The test conditions are as follows:

The fastening of the connecting rods was representative of the fastening on the engine: yoke, pins, nuts.

Two endurance tests were conducted:
  one endurance test during $5\times10^7$ cycles at a frequency of 2000 Hz with an acceleration of 25 g, applied in the axial direction of the ball-joint,
  one endurance test during $7.2\times10^7$ cycles on the connecting rod natural frequency on the 1F mode (1200 Hz) at an acceleration of level 25 g, applied in the axial direction of the ball-joint.

The results of the tests are as follows: for A one finds start of wear of the ball-joint translated into a loss of rotation torque due to degradation of the self-lubrication cloth under the effect of micro-movements, and a start of play occurring between the ball-joint and its cage. For B one finds absence of any change in the mechanical behaviour of the ball-joint throughout the endurance test. These results show that the resistance of the suspension connecting rods to vibrating endurance is not degraded but is significantly improved.

The invention claimed is:

1. An absorber for a connection component that includes a head with two faces parallel to each other that is traversed by a bore forming a housing for a ball-joint, said absorber comprising:
    two disk elements parallel to each other, each disk element having an outer surface and an inner surface, the inner surfaces of the disk elements facing each other, being spaced apart, and being substantially flat and parallel to each other, and wherein each of said two disk elements define a central opening,
    a connector that includes a plurality of arms that each extend from a periphery of a first one of the two disk elements to a periphery of a second one of the two disk elements so as to connect the two disk elements.

2. An absorber according to claim 1, wherein a first thickness of a first disk element of the two disk elements is the same as a second thickness of a second disk element of the two disk elements.

3. An absorber according to claim 1, wherein a first thickness of a first disk element of said two disk elements is different from a second thickness of a second disk element of the two disk elements.

4. An absorber according to claim 1, wherein the connection component is a connecting rod.

5. An absorber according to claim 1, wherein the two disk elements include an elastomer material.

6. An absorber according to claim 5, wherein the two disk elements include a fluorosilicone based elastomer material.

7. An absorber according to claim 1, wherein the two disk elements include a material resistant to at least one of chemical aggression, oil, and kerosene.

8. An absorber according to claim 1, wherein said connector is formed by at least three arms.

9. An absorber according to claim 1, wherein said two disk elements are a first disc and a second disc, offset by a plurality of arms.

10. An absorber according to claim 1, wherein said connector includes six arms circumferentially placed around the periphery of the two disk elements.

11. An absorber according to claim 10, wherein the six arms are located so that a first circumferential distance between a first arm and a second arm adjacent to the first arm is the same for five of the six arms, and less than a second circumferential distance between a pair of adjacent arms.

12. An absorber according to claim 1, wherein said connector includes at least one arm extending in a direction substantially coplanar with the first one of the two disk elements, extending in a direction substantially orthogonal to the two disk elements, and extending in a direction substantially coplanar with the second one of the two disk elements.

13. An absorber according to claim 1, wherein said connector includes at least one arm projecting beyond the periphery of at least one of the two disk elements.

14. An absorber according to claim 1, wherein said connector includes at least two arms configured to retain the connection component free of assistance from a locking component.

15. An absorber system, comprising:
a connection component that includes a head with two faces parallel to each other that is traversed by a bore forming a housing for a ball-joint; and
an absorber according to claim 1 assembled on the connection component such that the inner surfaces of the disk elements contact said two parallel faces of said head, wherein the two disk elements have a thickness at least equal to a portion of the ball-joint which protrudes compared to one face of the head.

16. A method for mounting an absorber according to claim 1 on a connecting component supported by a pin between the lugs of a female yoke, comprising:
sliding the absorber around the head so that the two disk elements each respectively contact a first face and a second face of the head;
inserting the head with the absorber between the lugs of the yoke; and
locking the connecting component in the yoke using said pin.

17. A method according to claim 16,
wherein a first distance between the first face of the head and a first lug adjacent to the first face is greater than a second distance between the second face of the head and a second lug adjacent to the second lug,
wherein the two disk elements comprise a first disk element and a second disk element, the first disk element including a greater thickness than the second disk element,
further comprising placing the first disk element between the first face of the head and the first lug.

18. An absorber system, comprising:
a connecting component, mounted on a yoke with two lugs, and including an absorber according to claim 1,
wherein the absorber is located between each face of the connecting component and the lug which faces the absorber.

19. An absorber system, comprising:
a connection component that includes a head with two faces parallel to each other that is traversed by a bore forming a housing for a ball-joint; and
an absorber according to claim 1 assembled on the connection component such that the inner surfaces of the disk elements contact said two parallel faces of said head,
wherein the central opening of each of said two disk elements includes a diameter sufficiently wide so as not to cover portions of the ball joint which protrude in relation to the head.

* * * * *